COIN-RELEASED LOCKING MECHANISM

INVENTORS
MERRILL KRAKAUER
HENRY E. VERBEKE
BY Henry L. Shenier
ATTORNEY

INVENTORS
MERRILL KRAKAUER
HENRY E. VERBEKE
BY
Henry L. Shenier
ATTORNEY

INVENTORS
MERRILL KRAKAUER
HENRY E. VERBEKE
BY
ATTORNEY

INVENTORS
MERRILL KRAKAUER
HENRY E. VERBEKE
BY Henry L. Shenier
ATTORNEY

COIN-RELEASED LOCKING MECHANISM

INVENTORS
MERRILL KRAKAUER
HENRY E. VERBEKE
BY Henry L. Shenier
ATTORNEY

COIN-RELEASED LOCKING MECHANISM

Filed Sept. 10, 1959 11 Sheets-Sheet 6

INVENTORS
MERRILL KRAKAUER
HENRY E. VERBEKE
BY Henry L. Shenier
ATTORNEY

COIN-RELEASED LOCKING MECHANISM

INVENTORS
MERRILL KRAKAUER
HENRY E. VERBEKE
BY [signature]
ATTORNEY

INVENTORS
MERRILL KRAKAUER
HENRY E. VERBEKE
BY Harry L. Shenier
ATTORNEY

INVENTOR
MERRILL KRAKAUER
HENRY E. VERBEKE
BY Henry L. Shenier
ATTORNEY

INVENTORS
MERRILL KRAKAUER
HENRY E. VERBEKE
BY Harry L. Shenier
ATTORNEY

COIN-RELEASED LOCKING MECHANISM

Filed Sept. 10, 1959 11 Sheets-Sheet 11

MERRILL KRAKAUER
HENRY E. VERBEKE
INVENTORS

BY Henry L. Shenier

ATTORNEY 3,107,000
COIN-RELEASED LOCKING MECHANISM
Merrill Krakauer, Livingston, and Henry E. Verbeke, Chester, N.J., assignors to Rowe Manufacturing Co., Inc., Whippany, N.J., a corporation of New York
Filed Sept. 10, 1959, Ser. No. 839,218
15 Claims. (Cl. 194—2)

Our invention relates to a coin-released locking mechanism for vending machines adapted to sell a large number of different items of merchandise or services at various prices and more particularly to a coin-released locking mechanism which embodies improvements over coin-released locking mechanisms known in the prior art.

The recent development in the art of automatic merchandising has been such that a single machine is required to sell a large number of different brands and types of articles at various prices. The prices at which many articles are sold are subject to change without notice. Some locations at which merchandising machines are to be installed require purely mechanical machines which need no electrical power for their operation. In other locations it is desirable that electrically operated machines be installed.

Most merchandising machines are provided with a normally locked member which must be released in response to the deposit of coins in the machine to permit a sale to take place upon the actuation of a selecting means. This operation necessitates a coin register or mechanism for releasing the normally locked member in response to the deposit of a sum in coins aggregating the purchase price of the desired article. In a modern merchandising installation the coin mechanism must be readily and easily set up for a wide range of prices. It should totalize any combination of various coins deposited in the machine. It is desirable that a single coin mechanism be capable of controlling a large number of machine sections carrying supplies of merchandise selling at various prices. In the event that a sum in excess of the sale price of an article is deposited in the machine, the correct sum in change must be given to the customer.

Coin mechanisms of the prior art are not sufficiently flexible to accomplish all the desiderata outlined above. They are not sufficiently flexible to permit the sale of articles over a wide price range. Many mechanisms of the prior art adapted to give change employ elaborate electrical circuitry for setting up the change-maker to give the correct change upon operation of the machine. Moreover, many of the coin-released locking mechanisms of the prior art can be released by jarring or shaking the machine with the result that they do not adequately protect the merchandise against the depredations of dishonest persons.

We have invented an improved coin-released locking mechanism for use with a merchandising machine adapted to sell a large number of different kinds and brands of merchandise at various prices. Our mechanism is extremely flexible in that it totalizes any combination of coins deposited in the machine and in that it may readily be set up to accommodate an extremely wide range of prices. These results are accomplished with a very small number of parts. Our improved coin register is capable of controlling a number of machine sections selling merchandise at different respective prices. Our mechanism accomplishes this result while at the same time giving the correct change to a customer in the event a sum in excess of the sale price of a selected article is deposited in the machine. Our mechanism always gives change in the same manner with reference to the base price, no matter for what base price the mechanism is set and whether or not a price differential is provided. We provide our register with means for automatically replenishing the supply of change from coins deposited in the machine. Our register holds deposited coins in escrow until the merchandise is delivered to prevent loss of money to the customer if the selected container is empty and to permit the customer to change his mind before delivery of the merchandise. Our coin-released locking mechanism is tamper-proof in that it cannot readily be released by jarring the machine. Our construction may be incorporated in either a mechanically-operated machine or an electrically-operated machine. It employs very few moving parts with the attendant advantages of reliability and ease of manufacture.

One object of our invention is the provision of a coin-released locking mechanism which is extremely flexible both as to the combination of coins which it may receive and as to the range of prices for which it may be set.

Another object of our invention is to provide a coin-released locking mechanism which is capable of controlling a number of machine sections selling articles of merchandise at different respective prices.

A further object of our invention is to provide a coin-released locking mechanism which gives the correct change to a customer in the event a sum in excess of the sale price of a selected article is deposited in the machine.

Yet another object of our invention is to provide a coin-released locking mechanism in which the supply of change is automatically replenished from coins deposited in the machine.

A still further object of our invention is to provide a coin-released locking mechanism in which deposited coins are held in escrow in the machine until the selected article of merchandise is delivered to the customer.

Still another object of our invention is to provide a coin-released locking mechanism in which the locked member cannot readily be released by jarring the machine.

A still further object of our invention is to provide a coin-released locking mechanism having a construction which may be incorporated in either a mechanically-operating machine or an electrically-operating machine.

A still further object of our invention is to provide a coin-released locking mechanism having a small number of moving parts.

Other and further objects of our invention will appear from the following description.

In general, our invention contemplates the provision of a coin-released locking mechanism for a merchandising machine comprising interengageable stop means carried by a totalizer bar and by a locking bar responsive to operation of the machine-selecting means. A totalizer mechanism responsive to the deposit of coins in the machine positions the totalizer bar in accordance with the sum in coins deposited in the machine. If no price differential is provided, the locking bar is free to move in response to operation of the selecting means after the totalizer bar has been positioned. Where there is a price differential, a mechanism responsive to operation of the selecting means moves the locking bar through a distance corresponding to the price differential of the selected article to a position at which it is free to move.

Our machine includes a change bar which moves in response to movement of the totalizer bar to set up a credit in the machine and to set the machine change mechanism to give a number of nickels in change aggregating the difference between the base price for which the register is set and the sum deposited. Means responsive to the operation of the price differential mechanism moves the change bar through a distance corresponding to the price differential to subtract the price differential from the deposited credit. The resulting overall movement of the change bar corresponds to the deposited sum less the price differential to cause the change mechanism to give the correct sum in change.

In the accompanying drawings which form part of the instant specification and which are to be read in conjunction therewith and in which like reference numerals are used to indicate like parts in the various views:

FIGURE 1 is a side elevation of our improved coin-released locking mechanism.

FIGURE 2 is a fragmentary front elevation of our coin-released locking mechanism taken along the line 2—2 of FIGURE 1 and drawn on an enlarged scale, and showing its relation to one form of merchandising machine with which it may be used FIGURE 3 is a fragmentary sectional view of one form of merchandising machine with which our coin-released locking mechanism may be used, taken along the line 3—3 of FIGURE 2.

Figures 1, 6:
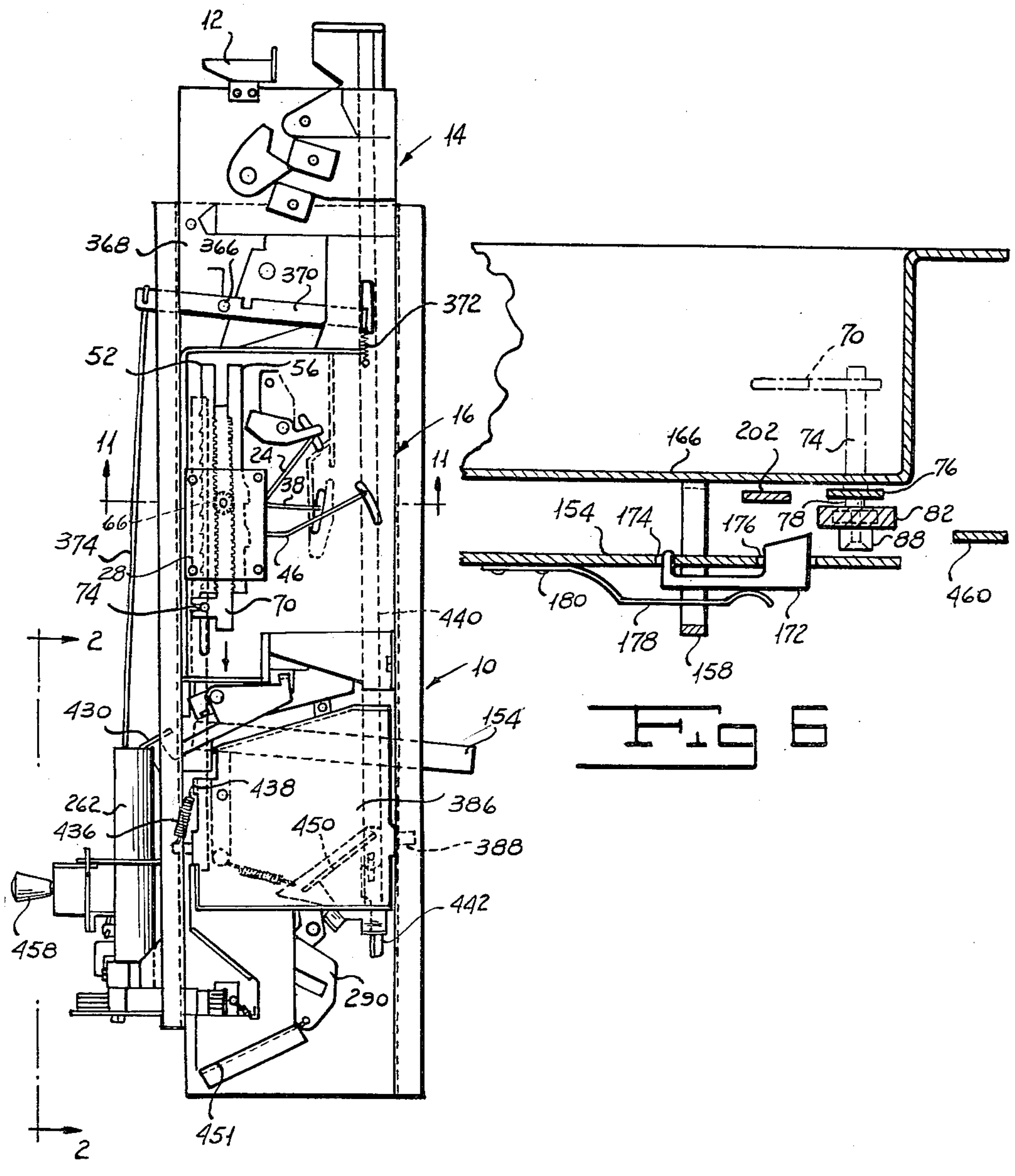
FIGURE 6 is a fragmentary sectional view of our coin-released locking mechanism taken along the line 6—6 of FIGURE 4.

Referring now to FIGURE 1 of the drawings, our improved coin-released locking mechanism includes a frame indicated generally by the reference character 10 on which the various units of the register are mounted. Coins deposited in the machine (not shown) with which our coin-released locking mechanism is used pass through a coin receptacle 12 and into a coin separator and slug ejector indicated generally by the reference character 14 which rejects spurious coins and slugs and which separates true coins by denomination. Since this slug ejector and coin separator 14 per se does not form part of our invention, it will not be described in detail. It may be of any suitable type known to the art, such, for example, as that shown and described in the copending application of Christian Gabrielsen, Serial No. 469,183 filed November 16, 1954 for a Coin Separator and Slug Ejector, now Patent No. 2,975,880. After passing through the separator 14, true coins such, for example, as nickels, dimes, and quarters, enter a coin totalizer indicated generally by the reference character 16.

Referring now to FIGURES 1 and 10 to 13, nickels, dimes, and quarters leaving the coin separator and slug ejector 14 enter the totalizer 16 and travel through respective passages indicated generally by the reference characters 18, 20, and 22 respectively in the totalizer. For the purpose of clarity, in FIGURE 12 we have indicated the respective paths of coins through the totalizer as a dotted-line path for a nickel, a broken-line path for a dime, and a dot-dash line path for a quarter. It will readily be apparent that in the course of its passage through totalizer 16, a nickel engages and actuates a feeler 24 extending through the path of a nickel through an arcuate opening 26 in panel 28 of the totalizer. Respective guides 30 and 32 guide the nickel along its passage 18 through the totalizer.

A dime travelling along its path 20 is guided by guides 34 and 36 to strike the feeler 24 which extends through a dividing partition 37 of the totalizer and into the passage 20 of a dime. After having actuated the feeler 24, the dime actuates a feeler 38 which extends through an arcuate opening 40 in panel 28 and through the guide 37 into the passage 20.

A quarter entering the totalizer 16 is guided along its path 22 by an extension 42 of guide 32 and by a guide 44. As a quarter travels along its path, it actuates a feeler 46 which extends through an arcuate opening 48 in panel 28 and into the path 22 of a quarter.

Figure 12:
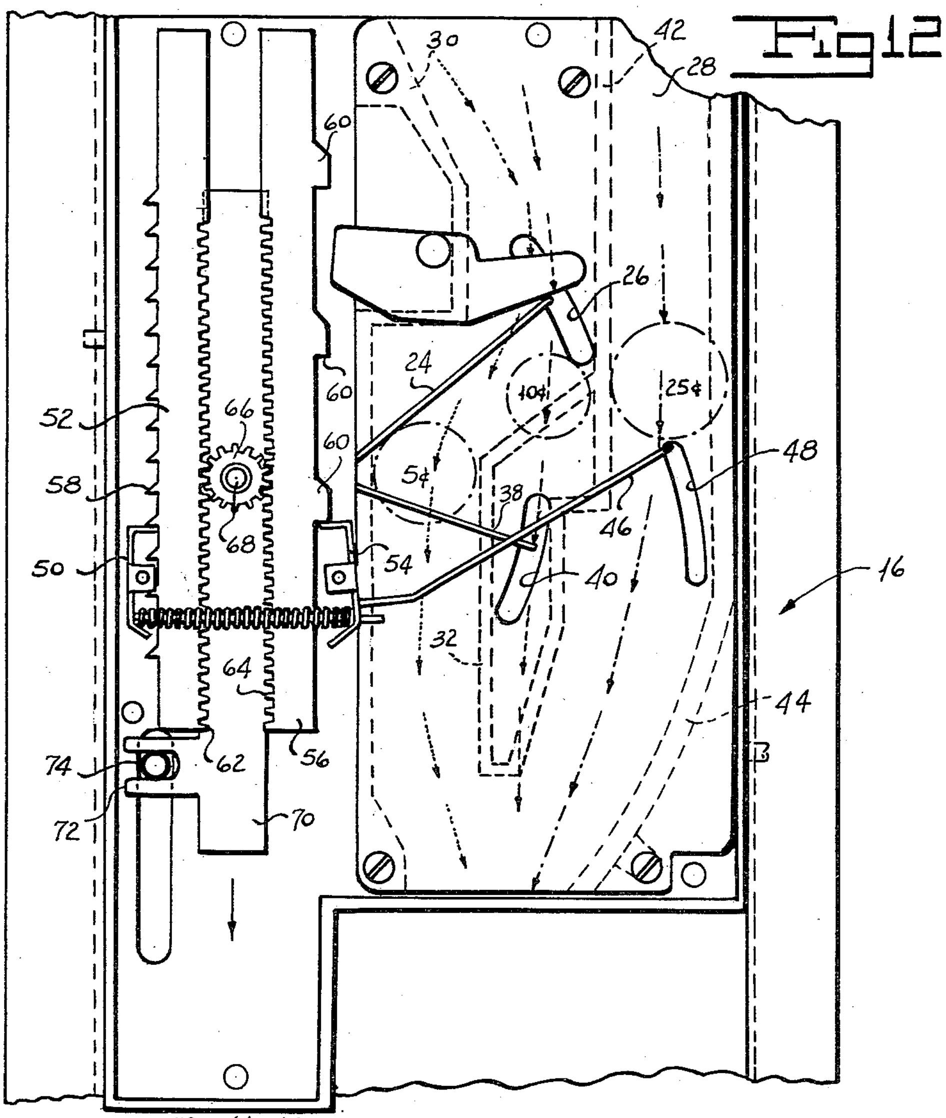
FIGURE 12 is a fragmentary front elevation of the totalizer mechanism of our coin-released locking mechanism.
Figure 11:
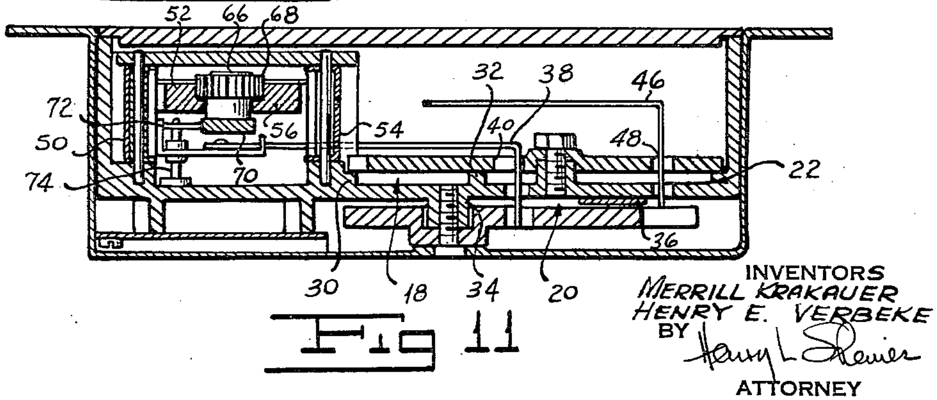
FIGURE 11 is a sectional view of our coin-released locking mechanism taken along the line 11—11 of FIGURE 1 and drawn on an enlarged scale.

From a structure thus far described, it will be seen that a nickel travelling along its passage 18 actuates feeler 24, a dime travelling along its passage 20 actuates feelers 24 and 38, while a quarter travelling along its passage 22 actuates a feeler 46. Since the coin totalizer per se forms no part of our invention, it will not be described in detail. The details of this register are shown in the copending application of Christian Gabrielsen, Serial No. 520,263, filed July 6, 1955, for a Mechanical Coin Totalizer, now Patent No. 2,957,568. As is set forth in the copending application, each of the feelers 24 and 38 controls the action of an escapement latch 50 which normally restrains a rack 52 against movement downwardly under the influence of gravity. Similarly, the feeler 46 controls the action of an escapement latch 54 which normally restrains a rack 56 against downward movement. Each time a feeler 24 or 38 is actuated, latch 50 permits one step of movement downwardly of rack 52 through a distance determined by the spacing between the teeth 58 of rack 52. Similarly, each time the feeler 46 is actuated, escapement latch 54 permits one step of movement downward of rack 56 determined by the spacing between the teeth 60 of rack 56. As shown in FIGURE 12, the spacing between teeth 60 is five times the spacing between teeth 58. Thus, each time feeler 46 is actuated, rack 56 moves downward through a distance which is five times the distance through which rack 52 moves for a single actuation of escapement latch 50. Racks 52 and 56 have teeth 62 and 64 respectively on the inboard edges for supporting a pinion 66 pivotally mounted on a shaft 68 carried by a link 70.

As the various feelers 24, 38, and 46 are actuated by coins passing through the totalizer, pinion 66 and link 70 have an overall downward movement which is proportional to the aggregate sum of coins passing through the totalizer. We form the end of link 70 with a bifurcated portion 72 for receiving a pin 74 carried by the upper end of a register bar 76 as viewed in FIGURES 4 and 13. The lower end of register bar 76 carries a pin 78 which supports a roller 80. A stop bar 82 guided for vertical movement in brackets 84 and 86 rests on the roller 80. We mount a stop block 88 on the stop bar 82 by any convenient means such as screws 90 threaded into holes 92 in the stop bar 82. The location of the stop block 88 on the stop bar 82 may be changed merely by threading the screws 90 into different sets of holes 92.

Figure 3:
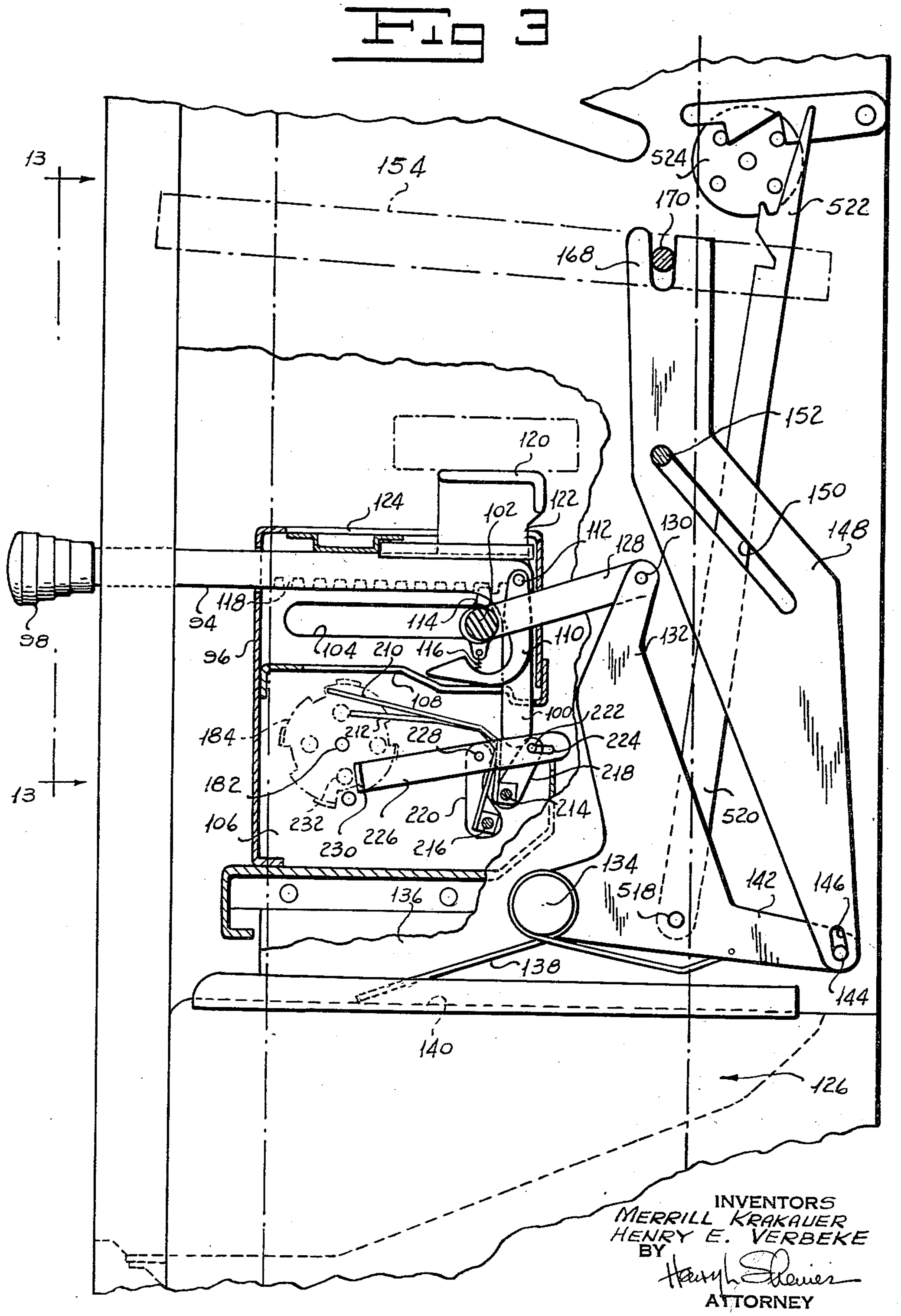

Referring now to FIGURE 3, the machine with which our totalizer is used includes a plurality of selecting pull bars 94 corresponding in number to the respective sections of the machine. Each pull bar 94 is slidably mounted in a housing 96 for movement outboard of the machine, or to the left as viewed in FIGURE 3, and for a return movement. When a pull bar 94 is actuated by knob 98, a dependent finger 100 formed on the bar engages the machine operating bar 102. We mount the operating bar 102 for sliding movement fore-and-aft in the machine in slots formed in the frame panels of housing 96. We have shown one operating bar slot 104 in one of the side panels 106 of the housing 96 in FIGURE 3. As the operating bar 102 moves to the left in FIGURE 3 under the action of a finger 100, a cam plate 108 disposed within housing 96 engages the underside of a latch 110 pivotally supported on a pin 112 on the pull bar 94 to cam the latch 110 into a position at which it may engage the operating bar 102 during the return movement of the pull bar 94. This action ensures that the operating bar 102 will return with the actuated pull bar 94. One end of the operating bar 102 rotatably carries a follow-through pawl 114 normally urged to operative position by a spring 116 connected between the pawl 114 and the housing 96. Pawl 114 engages the teeth of a rack 118 to prevent return motion of the pull bar 94. A pusher 120 carried by a portion 122 of pull bar 94 extending upwardly through a slot 124 in the top of housing 96 normally supports the lowermost article in the columnar container with which the pusher is associated. During the initial or outboard stroke of a pull bar 94 the package supported by the corresponding pusher 120 drops behind the pusher 120. When the pull bar 94 returns, pusher 120 drives the package which has fallen there behind into a delivery chute indicated generally by the reference character 126 for delivery to a customer in a manner known to the art.

We connect one end of a link 128 to the operating bar 102. A pin 130 pivotally connects the other end of link 128 to one arm 132 of a bell crank pivotally supported on a shaft 134 carried by a side panel 136 of the assembly. One end of a spring 138 coiled around shaft 134 bears against a flange 140 formed on the side panel 136. The other end of spring 138 engages the other arm 142 of the bell crank including arm 132 to urge the bell crank to rotate in a clockwise direction as viewed in FIGURE 3. A pin 144 carried by arm 142 rests in a slot 146 formed in the lower end of a locking link 148 formed with a slot 150 which supports the link 148 on a pin 152 carried by panel 136. It will be seen that when a pull bar 94 is moved to the left, link 128 moves the bell crank including arms 132 and 142 in a counterclockwise direction. This movement of the bell crank urges the locking link upwardly as viewed in FIGURE 3 and pin 152 in slot 150 guides the link to cause the upper end of the link to move to the left as viewed in FIGURE 3.

Referring now to FIGURES 3, 4, 6 and 13, our coin-released locking mechanism includes a locking bar 154 supported for movement in a bracket 156 on the frame 10 and in a bracket 158 formed on a plate 160 having slots 162 by means of which the plate is carried on pins 164 on a panel 166 of the frame 10. We form the upper end of link 148 as viewed in FIGURE 3 with a bifurcated portion 168 for engaging a pin 170 on the lock bar 154.

When a pull bar 94 is actuated, the bell crank including arm 132 moves in a counterclockwise direction to drive locking link 148 upwardly to cause its upper end to move to the left as viewed in FIGURE 3. This causes pin 170 to move to the right as viewed in FIGURE 4. A stop pawl 172 rests loosely in slots 174 and 176 formed in the locking bar 154. A flat spring 178 secured to the locking bar 154 by means of a rivet 180 or the like normally positions the pawl 172 with its end extending through slot 176 in a position to engage the stop block 88 on stop bar 82 as the locking bar 154 moves to the right as viewed in FIGURES 4 and 13. If a sum in coins equal to the base price for which the mechanism is set has been deposited in the machine, stop bar 82 will be in a position to permit the stop pawl 172 to clear the stop block 88 when the pull bar 94 associated with an article of merchandise selling for the base price is actuated. Spring 178 permits the lock pawl 172 to ride over stop block 88 during the return stroke of pull bar 94 after the stop bar 82 has been reset in a manner to be described.

Figure 4:
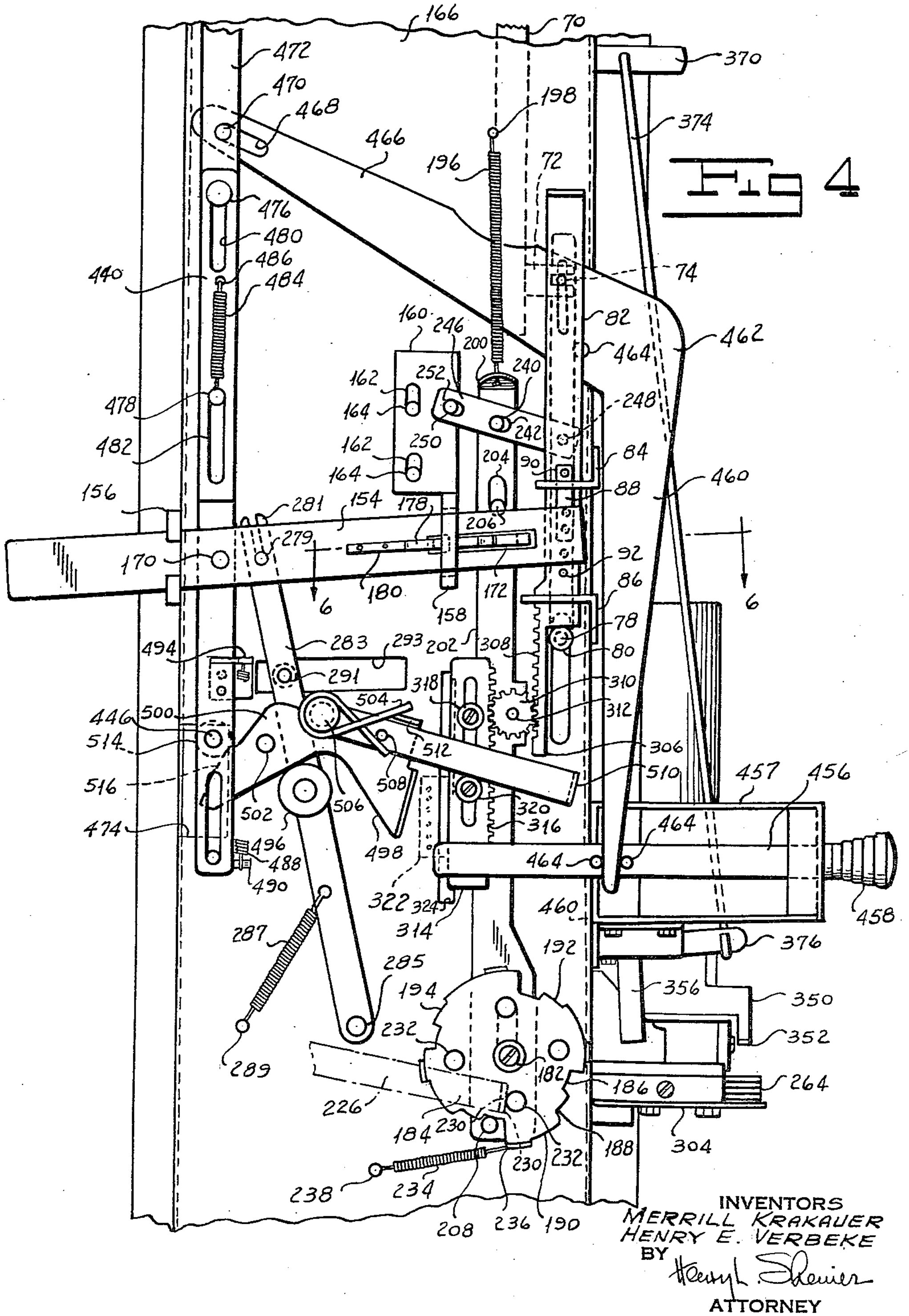
FIGURE 4 is a fragmentary sectional view of our coin-released locking mechanism taken along the line 4—4 of FIGURE 2.

Our mechanism includes a price differential for permitting a single coin-released locking mechanism to control a number of machine columns or sections selling articles at various prices. Referring to FIGURES 3 and 4, shaft 182 carried by panel 166 rotatably supports a price differential cam 184 formed with various levels representing a base price and other prices having predetermined differentials from the base price. The lowermost level 186 of the price differential disk 184 represents the base price corresponding to that price for which the stop block 88 is set and this represents no price differential. Other levels of the cam disk 184 may represent price differentials in multiples of the base coin used in the machine, such, for example, as multiples of a nickel. For example, the level 188 of the cam may represent a differential of 15¢, the level 190 may represent a differential of 20¢, and the respective levels 192 and 194 may represent differentials of 5¢ and 10¢.

A spring 196 connected between a pin 198 on panel 166 and a lug 200 on one end of a price differential link 202 slidably mounted on a pin 206 on panel 166 by means of a slot 204 normally urges the link upwardly as viewed in FIGURE 4 to cause a pin 208 on the lower end of the price differential link 202 to bear against a level on the periphery of price differential disk 184.

Our mechanism includes respective price differential crank arms 210 and 212 carried by respective shafts 214 and 216 extending between the sides of the housing 96. The respective shafts 214 and 216 carry crank arms 218 and 220 for rotation with the shafts. A pin 222 on the end of crank arm 218 remote from shaft 214 rests in a slot 224 formed in an end of a price differential disk drive rod 226. A pin 228 in the end of crank arm 220 remote from shaft 216 passes through price differential drive rod 226.

It is to be understood that only one crank arm 210 or 212 or no crank arm at all is associated with a respective section of the machine. If a crank arm is provided, it is actuated by the finger 100 of the associated pull bar 94 as the bar moves to the left as shown in FIGURE 3. This actuation of a crank arm 210 or 212 causes the associated shaft 214 or 216 to rotate in a counterclockwise direction as viewed in FIGURE 3. As a result of this rotation of the shaft, the associated crank 218 or 220 actuates the price differential disk drive rod 226. The arrangement is such that actuation of crank arm 218 moves the drive rod through twice the distance as does actuation of the crank arm 220. Slot 224 permits movement of the price differential disk drive rod 226 under the action of crank arm 220. We form the end of price differential disk drive rod 226 with an offset tab 230 adapted to engage one of a number of pins 232 on the price differential disk 184. A spring 234 secured between a lug 236 on the disk 184 and a pin 238 on the panel 166 normally urges the disk to rotate in a clockwise direction to hold pin 232 in engagement with lug 230.

We arrange price differential levels in groups of three, spaced around the periphery of disk 184. The lowest level of each group represents no price differential while the other two levels of a group represent selected differentials. For example, one group may include no price differential and differentials of 10¢ and 15¢ over the base price. In the normal position of the disk, pin 208 rests against the level representing no price differential.

As has been explained hereinabove, if a selected article sells at the base price, upon the deposit of a sum aggregating at least this base price in the machine, bar 82 is in a position such that block 88 is out of the path of movement of pawl 172 when lock bar 154 moves in response to the operation of a selecting pull bar 94. If a section of the machine is provided with a price differential, operation of the associated pull bar 94 causes finger 100 to actuate the associated crank finger 210 or 212 to cause rod 226 to drive the disk 184 through a distance to position the pin 208 on the first or second level of the group of price differential levels for which the disk is set. This action causes bar 202 to move downwardly through a distance depending upon the level to which pin 208 has moved. For example, if pin 208 moves onto the 5¢ level, bar 202 moves through a predetermined distance. As pin 208 moves to the 15¢ level, bar 202 moves through three times the distance it moved when pin 208 moved to the 5¢ level.

A pin 240 on bar 202 rests in a slot 242 in a lever 246 pivotally supported on a pin 248 carried by panel 166. A slot 250 in the end of lever 246 remote from pin 248 engages a pin 252 carried by plate 160 to support the plate in a position at which the lower ends of slots 162 engage pins 164. That is, spring 196 normally urges bar 202 to move upwardly as viewed in FIGURE 4 and, with pin 208 bearing against the level of disk 184 representing the base price, the lever 246 urges plate 160 to its uppermost position as viewed in FIGURE 4. When, however, a price differential is provided, disk 184 is driven in a counterclockwise direction as viewed in FIGURE 4 to move the bar 202 downwardly to cause bracket plate 160 to move downwardly to permit locking bar 154 to rotate through a small distance in a clockwise direction. When this occurs, it will be apparent that block 88 must be moved a greater distance downwardly before the normally locked bar 154 can move pawl 172 past block 88. Thus, a sum in coins which exceeds the base price by the amount of the price differential must be deposited in the machine before a purchase can be made. It is to be noted that this price differential including the floating bracket 160 is positively held by spring 196 against operation so that jarring or tilting of the machine will not readily move block 88 and pawl 172 out of coincident paths.

Our coin-released locking mechanism includes means for giving the correct sum in change when an amount in excess of the purchase price of a selected article has been deposited in the machine. Referring now to FIGURES 2, 4, 5, and 10, a bracket 254 secured to a member 256 of frame 10 by means such as a screw 258 is provided with a socket 260 for receiving a coin tube 262 adapted to hold a supply of coins of a suitable denomination such, for example, as nickels. A guide 264 at the lower end of tube 262 as viewed in FIGURE 5 supports a plurality of slides 266 adapted to receive nickels in openings 268 formed in the slides. Each slide 266 is formed with a lateral projection 270 adapted to be engaged by an arcuate flange 272 formed on the edge of a change slide coupling arm 274 pivotally supported on a pin 276 carried by a reset bar 278 which resets slides 266 in a manner to be described. In response to the actuation of a pull bar 94, after the deposit in the machine of a sum in coins aggregating the purchase price of the desired article, locking bar 154 moves to the right as viewed in FIGURE 4. Bar 154 carries a pin 279 which rides in the bifurcated end 281 of an arm 283 pivotally supported on a shaft 285 carried by panel 166. A spring 287 connected between the arm 283 and a pin 289 on panel 166 normally biases arm 283 to rotate in a counterclockwise direction as viewed in FIGURE 4. Arm 283 carries a pin 291 which extends through a slot 293 in panel 166. When bar 154 moves to the right as viewed in FIGURE 4, pin 291 moves to the left as viewed in FIGURE 5 to engage one arm 280 of the bifurcated end of a lever 282 pivotally supported on a shaft 284 carried by panel 166. We mount a pin 286 in the lower end of lever 282 as viewed in FIGURE 5 for engagement in a slot 288 formed in a drag link 290 pivotally supported on coupling arm 274 by a pin 292. A spring 294 extending between a pin 296 on reset bar 278 and a pin 298 on change slide coupling arm 274 normally urges the change slide coupling arm 274 to rotate in a clockwise direction as viewed in FIGURE 5. A spring 300 connecting drag link 290 to change slide coupling arm 274 holds the link 290 against pin 286.

Figure 5:
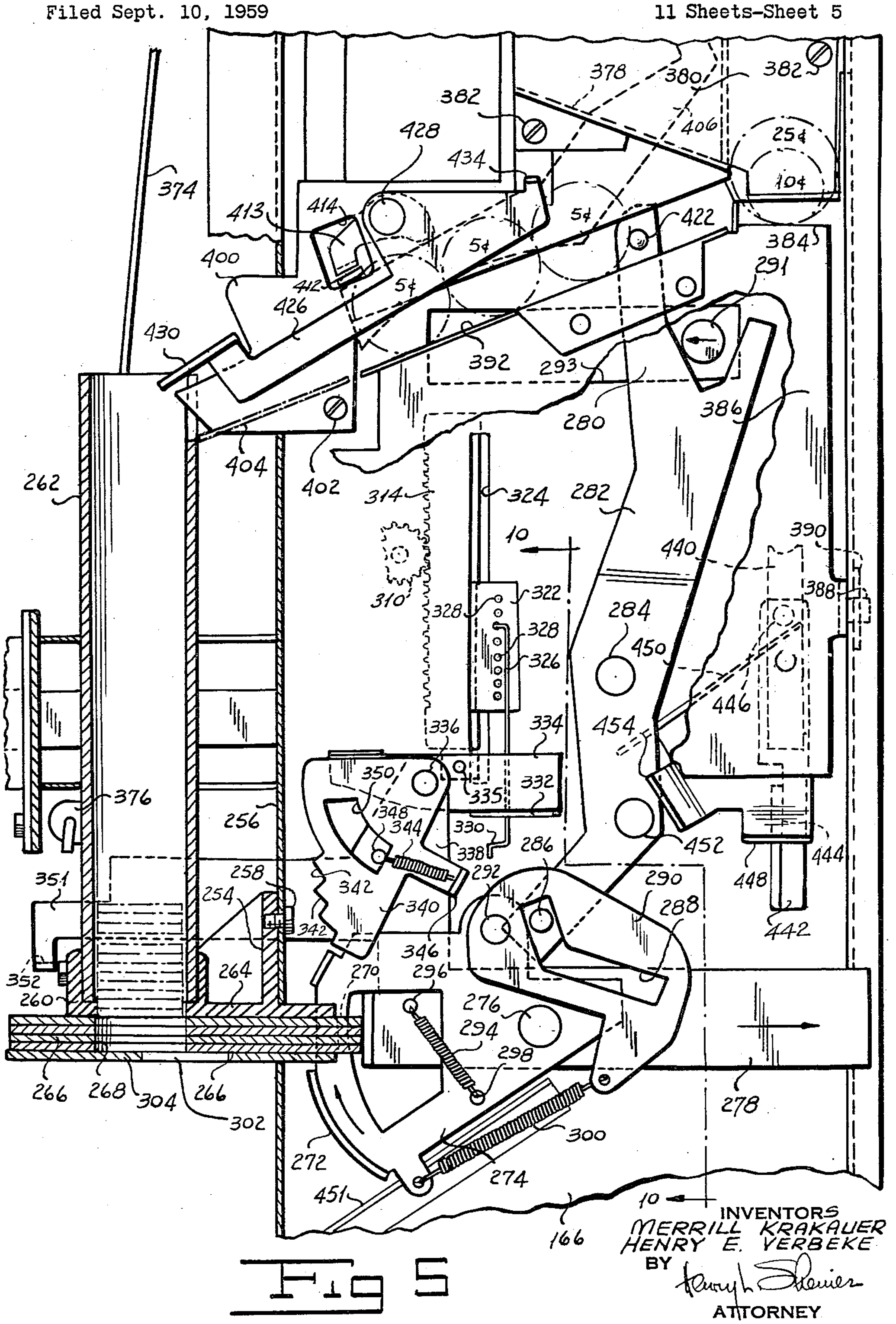
FIGURE 5 is a fragmentary sectional view of our coin-released locking mechanism taken along the line 5—5 of FIGURE 2.
Figure 7:
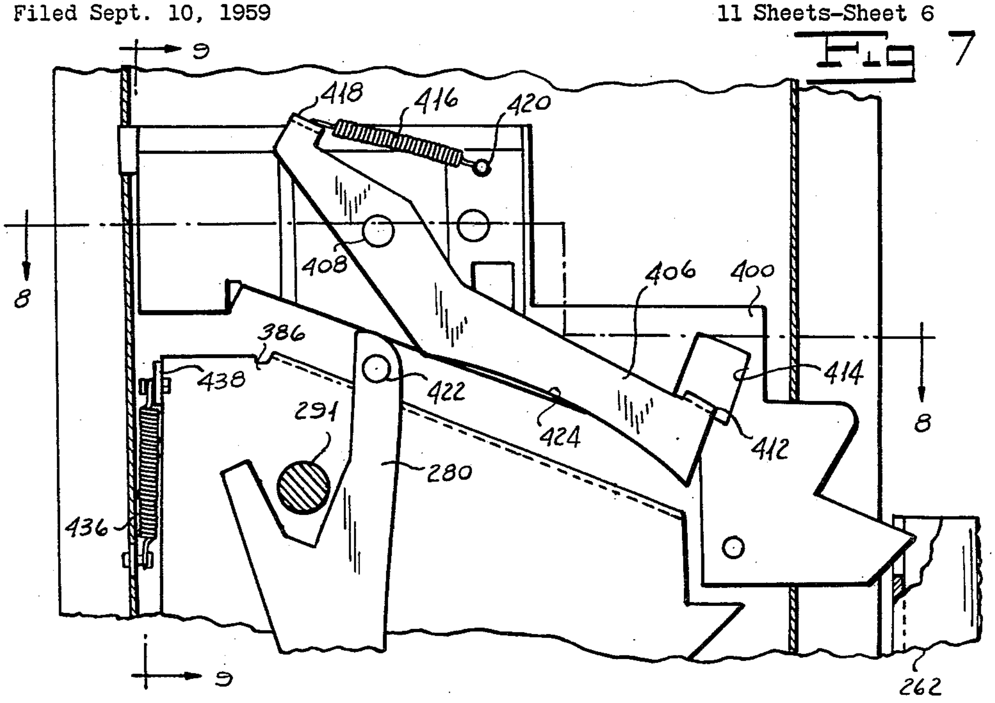
FIGURE 7 is a fragmentary sectional view of our coin-released locking mechanism taken along the line 7—7 of FIGURE 2.
Figures 8, 9:
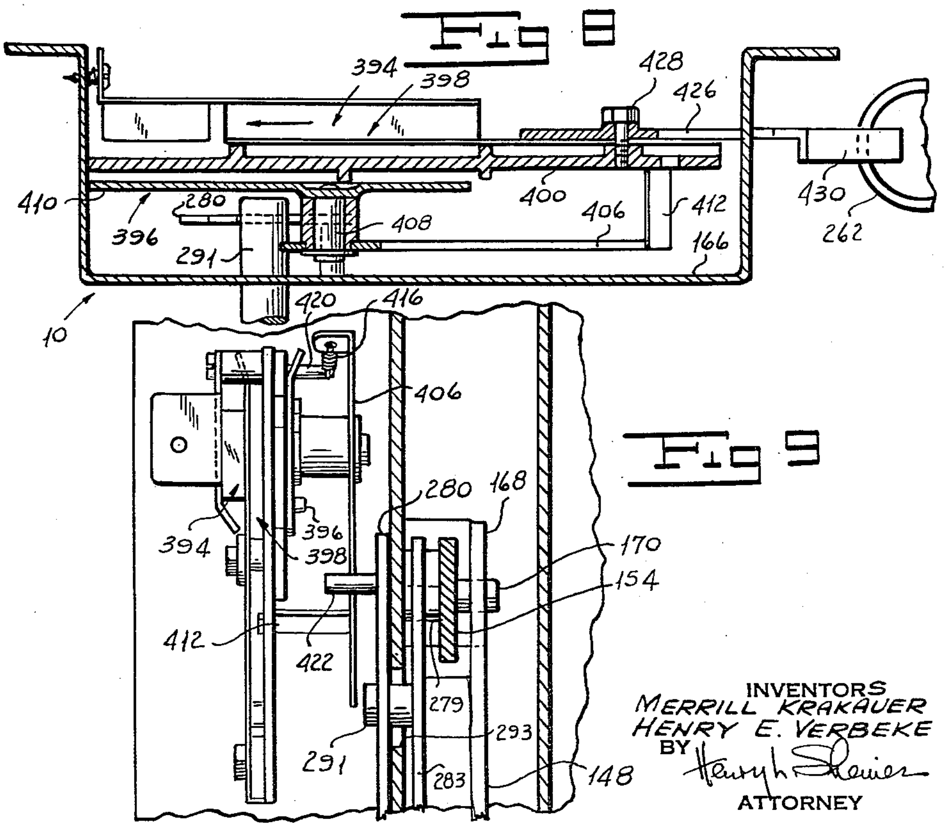
FIGURE 8 is a sectional view of our coin-released locking mechanism taken along the line 8—8 of FIGURE 7.
FIGURE 9 is a sectional view of our coin-released locking mechanism taken along the line 9—9 of FIGURE 7.

From the structure just described, it will be apparent that as pin 291 moves to the left as viewed in FIGURE 5, pin 286 acting on drag link 290 through slot 288 first tends to rotate change slide coupling arm 274 in a clockwise direction to engage flange 272 with the projections 270 on slides 266. Following its initial movement pin 286 acts through the drag link 290 to move the assembly including reset bar 278, drag link 290, change slide coupling arm 274, and the engaged slides 266 to the right as viewed in FIGURE 5 to cause the engaged slides to draw coins from the coin tube 262. When the openings 268 in the slides register with an opening 302 in the base 304 of guide 264, the coins fall through the slides through the opening 302 to be delivered to the customer in change. Spring 300 permits relative movement between drag link 290 and slide coupling arm 274 to prevent damage to the machine parts in the event that the change mechanism jams.

We provide our register with means for determining the amount of movement of change slide coupling arm 274 to determine the number of slides 266 engaged and thus the amount in change which is given to a customer.

Figures 10, 13:
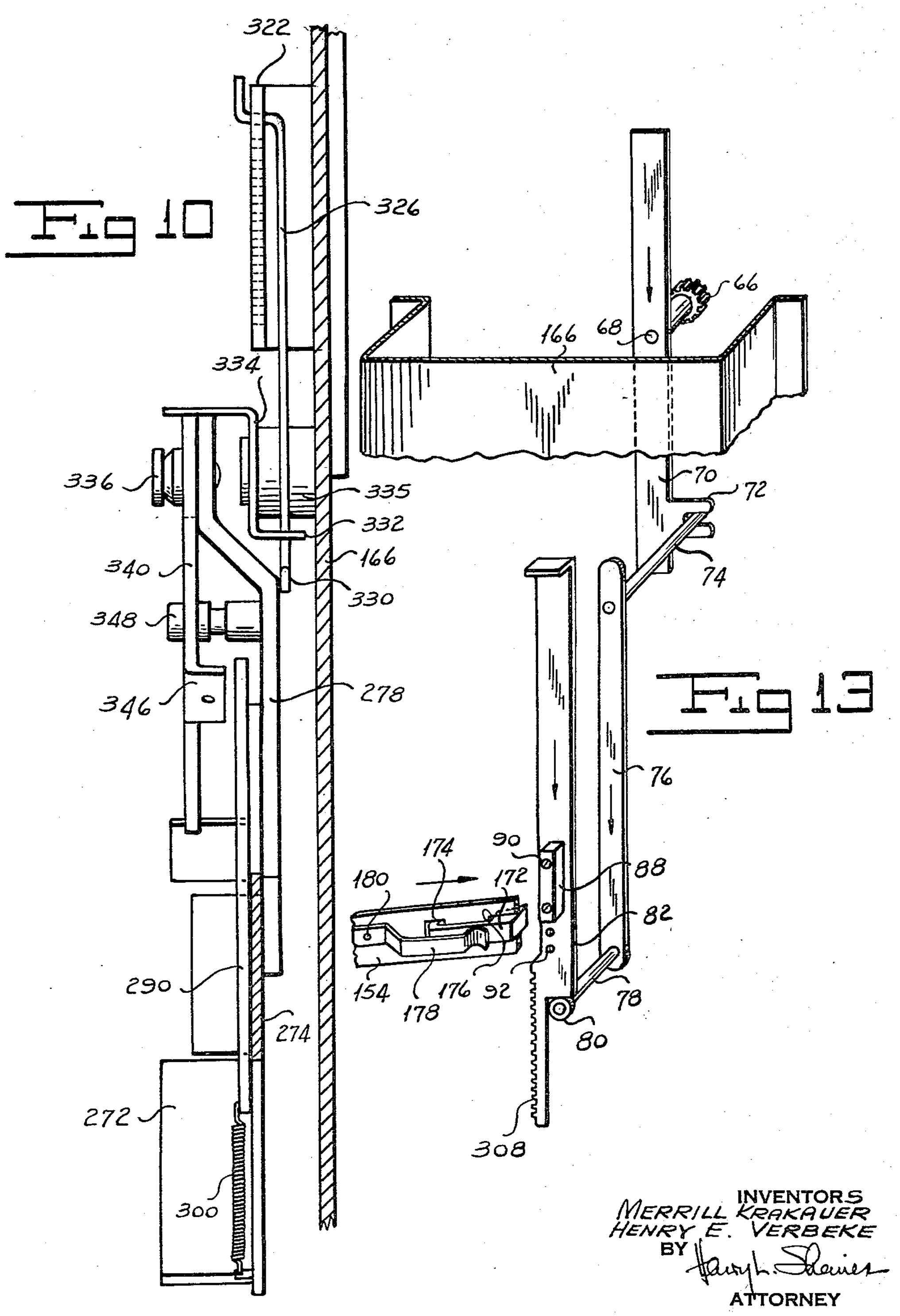
FIGURE 10 is a fragmentary sectional view of a portion of the change-maker of our coin-released locking mechanism.
FIGURE 13 is a perspective view showing the interengageable stop means of our coin-released locking mechanism with parts removed with other parts broken away.

Referring now to FIGURES 4, 5, and 10, stop bar 82 carries a depending portion 306 formed with teeth 308 for driving a pinion 310 pivotally supported on a shaft 312 carried by price differential link 202. Pinion 310 engages a change determining bar 314 formed with teeth 316 engaged by the pinion. We slidably mount bar 314 for vertical movement on a pair of bolts 318 and 320. We form bar 314 with a bracket 322 extending through an opening 324 in panel 166. A wire or rod 326 is adapted to be set in one of a number of holes 328 in bracket 322 to a price corresponding to the base price for which the machine is set. We form the lower end of rod 326 as viewed in FIGURE 5 with an offset portion 330 adapted to engage a lug 332 formed on a lever 334 pivotally supported on a pin 335 carried by panel 166. A pin 336 carried by a bracket 338 on reset bar 278 supports a stop plate 340 formed with a number of levels 342 corresponding to the number of coins in change to be given a customer. A spring 344 extends between a lug 346 on stop plate 340 and a pin 348 disposed in a slot 350 in stop plate 340 to hold the stop plate 340 in position against the pin 348.

Figure 2:
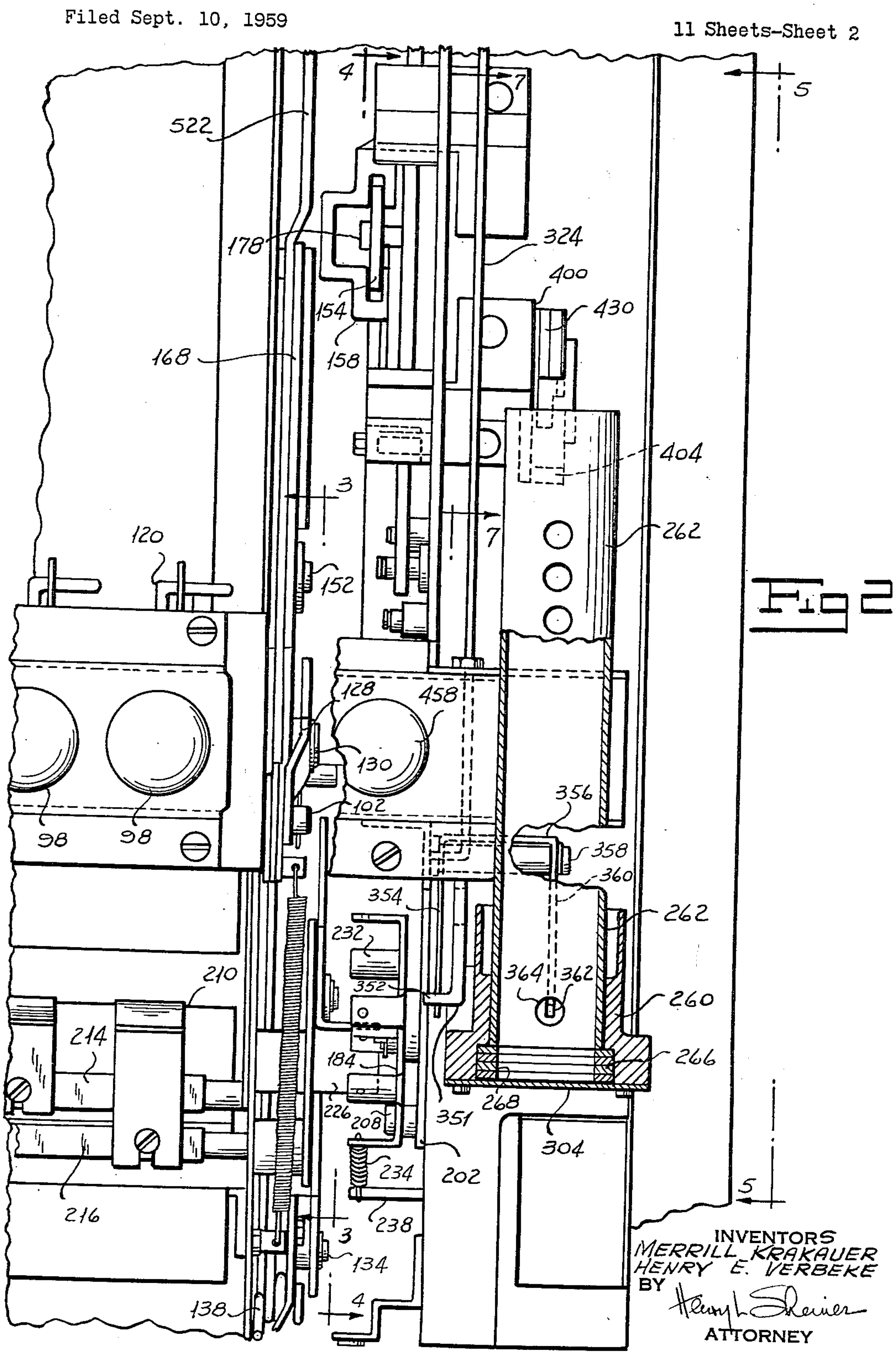

The reset bar 278 has an extension 351 formed with an offset lug 352. When the reset bar 278 moves to the right as viewed in FIGURE 5 in response to movement of the operating bar 102, lug 352 engages an arm 354 of a U-shaped member 356 pivotally supported on a shaft 358 supported by the frame 10, as shown in FIGURE 2. The other arm 360 of member 356 carries a feeler 362 adapted to enter the coin tube 262 through an opening 364 formed in the side of the tube to sense the presence or absence of coins in the tube. A pin 366 carried by the frame pivotally supports a lever 370. A spring 372 connected between an end of the lever 370 and the wall 368 normally urges the lever to pivot in a clockwise direction as viewed in FIGURE 1. A wire or rod 374 connects the end of lever 370 remote from spring 372 to the end of an arm 376 carried by dependent member 356 for movement therewith. From the structure just described, it will be apparent that spring 372 normally urges the member 356 to move in a direction to cause feeler 362 to move into the coin tube 262. Coins present in coin tube 262 normally prevent the feeler 362 from moving into coin tube 262. When reset bar 278 is moved to the right as viewed in FIGURE 5 in the manner described above, lug 352 pivots member 356, shown in FIGURE 2, in a direction to move the feeler 362 away from the coin tube against the action of spring 372. When sufficient coins are in the tube, this action relieves the pressure of the feeler 362 on the coins to permit the coins to drop downwardly into the slides 266. On the return stroke of the operating bar 102, feeler 362 is permitted to move toward the coin tube under the action of spring 372. If a supply of coins in the tube is below a predetermined level, the feeler is permitted to move into the tube and lever 370 moves under the action of spring 372 to cam a plate (not shown) into the slug ejector to deflect dimes and quarters in a manner known to the art to the machine coin return chute so that the machine can then only be operated in response to the deposit of nickels. It will be appreciated that rod 374 may, if desired, be used to operate an electrical or mechanical signal to inform the customer that the supply of change is exhausted.

Referring now to FIGURES 1, 5, 7 and 9, and 12, the path of quarters leaving the totalizer 16 is such that they move toward a surface 378 of a guide assembly 380 secured to the frame by means such as screws 382. Surface 378 guides quarters toward the horizontal portion 384 of the upper surface of a coin shelf 386 pivotally supported by journal 388 in bracket 390 carried by the frame 10. Dimes leaving the totalizer 16 are directed toward the surface 384 to rest on that surface, with the quarters, to be held in escrow until delivery is made in a manner to be described. Nickels leaving the totalizer are directed toward an inclined chute 392 on the upper surface of shelf 386. For purposes of clarity, we have indicated the respective paths of quarters, dimes, and nickels in FIGURES 8 and 9 generally by the respective reference characters 394, 396, and 398.

Nickels supported on chute 392 tend to move under the influence of gravity downwardly and to the left along chute 392 toward the coin tube 262. We secure a plate 400 to the frame by any convenient means such as screws 402. A chute 404 carried by a cover plate (not shown) or the like guides coins from chute 404 in phantom for purposes of clarity. We pivotally mount an escrow lever 406 on a pin 408 carried by a bracket 410 secured to the plate 400 by any convenient means such as welding or the like. One end of lever 406 is formed with an offset stop 412 which extends through an opening 414 in plate 400. A spring 416 secured between a lug 418 on the end of escrow lever 406 remote from stop 412 and a pin 420 on plate 400 normally biases escrow lever 406 to move in a clockwise direction as viewed in FIGURE 7 to cause stop 412 to rest against the lower edge of opening 414 in a position in the path of nickels resting on the chute 392 to prevent their entry into the coin tube 262.

Arm 280 of lever 282 carries a pin 422. When pin 291 is moved to the left as viewed in FIGURE 5 or to the right as viewed in FIGURE 7, pin 422 engages a cam surface 424 formed on the underside of escrow lever 406 to move the lever in a counterclockwise direction as viewed in FIGURE 7 or in a clockwise direction as viewed in FIGURE 5 to move stop 412 out of the path of nickels on chute 392 to permit the coins to roll down chute 404 and into the coin tube 262. In the course of its movement to release a nickel, lever 406 operates a stop 413 pivoted on pin 423 to permit only a single nickel to go to coin tube 262 on each operation of the machine. If more than one nickel were permitted to travel to the coin tube on an operation of the machine, they might jam in the tube. One end of a lever 426 pivotally supported on a shaft 428 on plate 400 carries a feeler 430 which normally moves under the influence of gravity in a counterclockwise direction as viewed in FIGURE 5 to sense the presence of coins adjacent the top of tube 262. When the coin tube is full, lever 426 moves in a clockwise direction to position a stop 434 on the end of the lever remote from feeler 430 into the path of nickels coming into the totalizer to prevent any nickels from moving into the coin tube when the tube is full.

A spring 436 extending between a lug 438 on shelf 386 and the frame 10 normally urges the lower edge of the shelf to move inwardly as viewed in FIGURE 5. Our machine includes a coin return link 440 adapted to be moved downwardly as viewed in FIGURE 5 in a manner to be described hereinafter when a customer wishes the return of deposited coins. We mount a member 442 having a surface 444 on the end of link 440 by means of a pin 446. Shelf 386, under the influence of spring 436, tends to move in a direction to cause a cam member 448 on the lower end of shelf 386 to bear against the surface 444. When the coin return link 440 moves downwardly, surface 444 moves out of the path of cam member 448 to permit the lower end of the coin shelf 386 to move inwardly as viewed in FIGURE 5 to cause coins supported by the coin shelf 386 to drop downwardly toward a chute 450 and toward a chute 451 which returns the coins to the customer through a suitable opening (not shown) in the machine.

We mount a cam pin 452 at a point intermediate the length of lever 282 extending below shaft 284. When, in response to movement of the operating bar, lever 282 rotates in a counterclockwise direction, cam pin 452 engages a cam member 454 carried by the lower end of the coin shelf 386 to move the lower end of the coin shelf 386 outwardly as viewed in FIGURE 5 to cause coins on the coin shelf 386 to drop to a suitable coin receptacle (not shown).

Referring now to FIGURES 1, 2, and 4, our machine includes a coin return pull bar 456 slidably mounted for movement in a housing 457 on the coin mechanism frame 10. We provide bar 456 with a knob 458 by means of which the bar may be actuated. One arm 460 of a bell crank 462 is disposed between a pair of pins 464 on bar 456. When bar 456 is moved to the right as viewed in FIGURE 4, bell crank 462 pivots in a counterclockwise direction about a pin 464 carried by the frame 10. We form the other arm 466 of bell crank 462 with a slot 468 in which we dispose a pin 470 carried by a drive link 472. We mount the coin return link 440 on a pair of spaced pins 476 and 478 carried by link 472 through the medium of a pair of slots 480 and 482 in link 440. A spring 484 secured between pin 478 and a pin 486 on link 440 normally positions link 440 in its uppermost position with pins 476 and 478 in the tops of their respective slots. A spring 488 extending between a pin 490 on link 440 and a guide bracket 494 on panel 166 normally urges the entire assembly upwardly as viewed in FIGURE 4. Guide bracket 494 guides the link 440 in its movement. It will be seen that as return bar 456 is pulled to the right as viewed in FIGURE 4, bell crank 462 moves in a counterclockwise direction to move link 440 downwardly through the medium of spring 484. Spring 484 permits lost motion between coin return link 472 and coin return link 440 in the event the return mechanism for any reason sticks.

We provide our mechanism with means for resetting the various parts of the machine in response to either the normal operation of the machine or in response to the operation of the coin return mechanism. Referring now to FIGURE 4, arm 283 carries a roller 496 adapted to engage a cam surface 498 on the underside of a reset arm 500 pivotally supported on a pin 502 carried by panel 166. A spring 504 carried by a pin 506 on reset arm 500 engages a pin 508 on a finger 510 pivotally supported on pin 506 to urge the finger into engagement with a stop 512 engaged by the other end of spring 504. When arm 382 pivots in a clockwise direction as viewed in FIGURE 4, roller 496 engages surface 498 to move arm 500 in a counterclockwise direction to cause the finger 510 to engage roller 80 to move the roller 80 and the totalizer bar upwardly to its next operation. The pin 446 on coin return link 440 extends through an opening 474 in panel 166 and carries a roller 514 adapted to engage a cam surface 516 on the end of reset arm 500 remote from finger 510. When coin return link 440 moves downwardly in the course of a coin return operation, roller 514 engages surface 516 to move arm 500 in a counterclockwise direction to cause finger 510 to reset the totalizer.

Referring to FIGURE 3, the arm 142 of the bell crank including arm 132 carries a pin 518 which pivotally supports a link 520 having an end 522 adapted to actuate the pin wheel 524 of a match mechanism (not shown) to deliver a packet of matches concomitantly with the delivery of a package of cigarettes if desired. Referring now to FIGURES 14 to 18, we have shown a form of our mechanism for use with an electrical machine. The slug ejector 14 and coin totalizer 16 of the electrical version of our machine are the same as those described in connection with the mechanical version of the machine shown in FIGURES 1 to 13. In response to the deposit of coins in the machine, roller 80 moves downwardly through a distance corresponding to the sum in coins deposited in the machine. Rather than employing a stop bar 82 in the electrical form of our machine, we employ a bar 526 formed with teeth 528 for engaging a pinion 530 pivotally supported on a shaft 532 in a housing 534. Pinion 530 carries for rotation therewith a contacting member 536 having a plurality of fingers 538 adapted to engage a number of printed circuit contacts 540 to connect various ones of these contacts to a common conductor 542.

Figure 14:
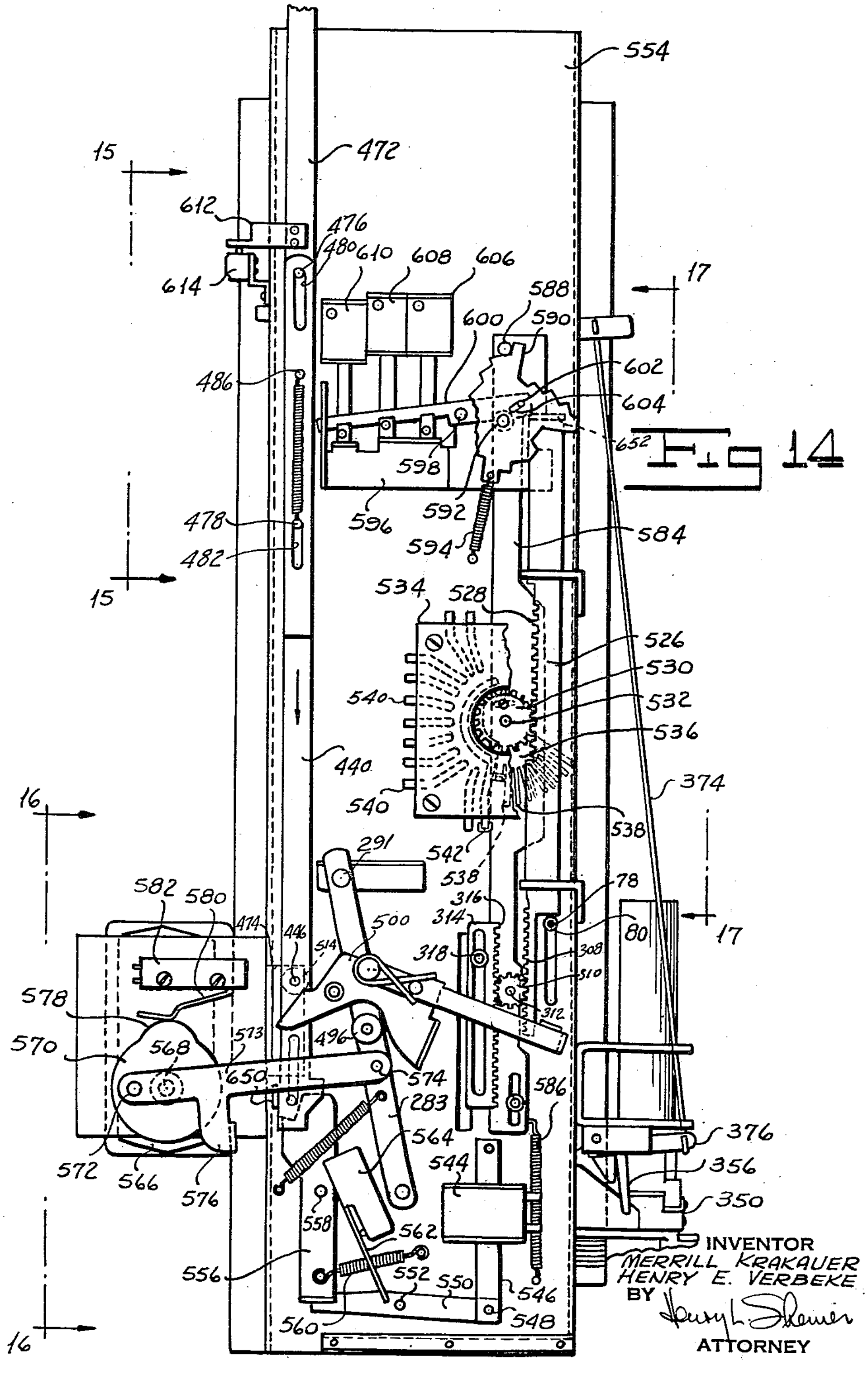
FIGURE 14 is a side elevation of the electrical form of our coin-released locking mechanism.
Figures 15, 16:
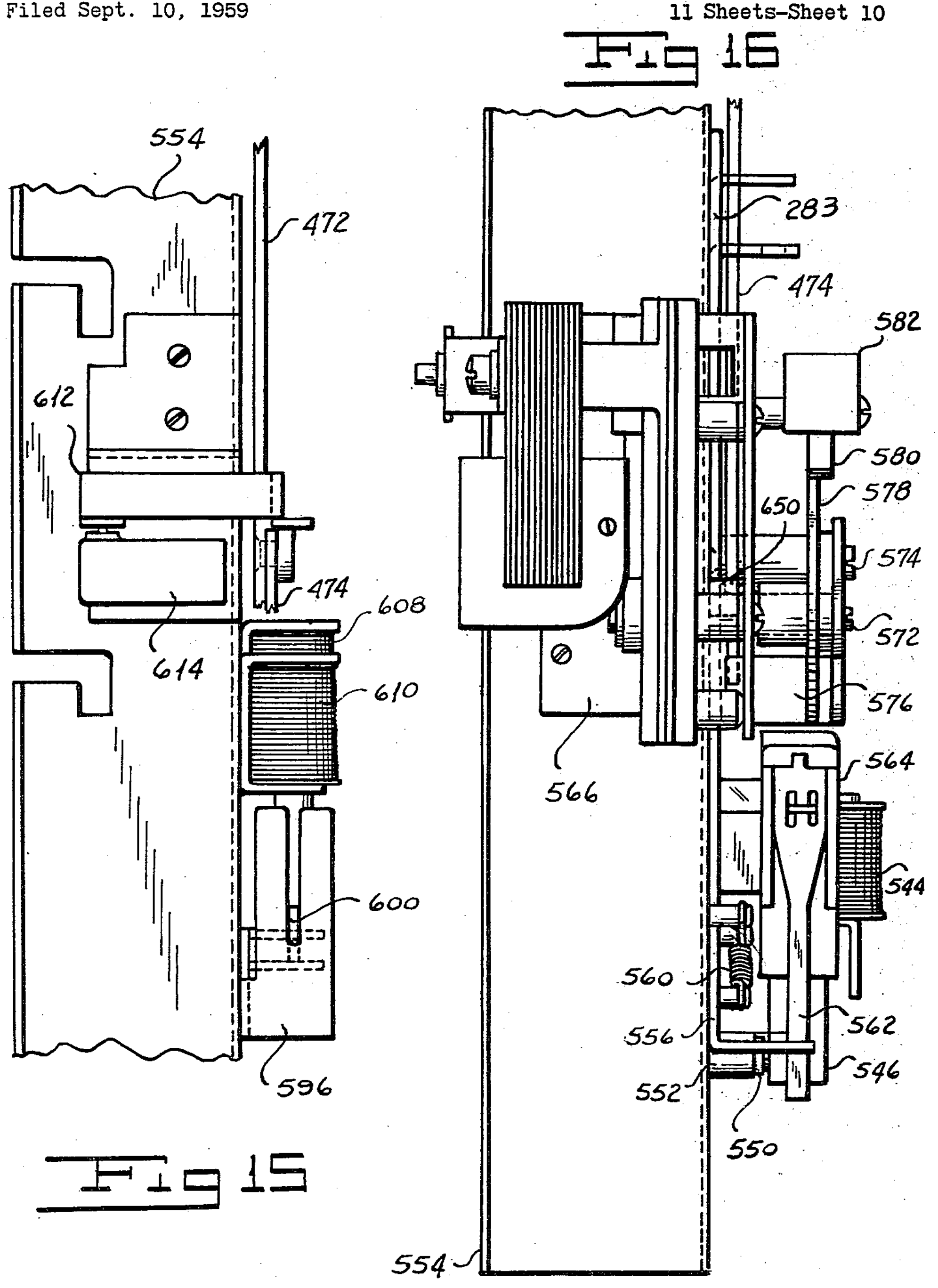
FIGURE 15 is a fragmentary front elevation of the electrical form of our coin-released locking mechanism taken along the line 15—15 of FIGURE 14 and drawn on an enlarged scale.
FIGURE 16 is a fragmentary elevation of the electrical form of our coin-released locking mechanism taken along the line 16—16 of FIGURE 14 and drawn on an enlarged scale.
Figure 17:
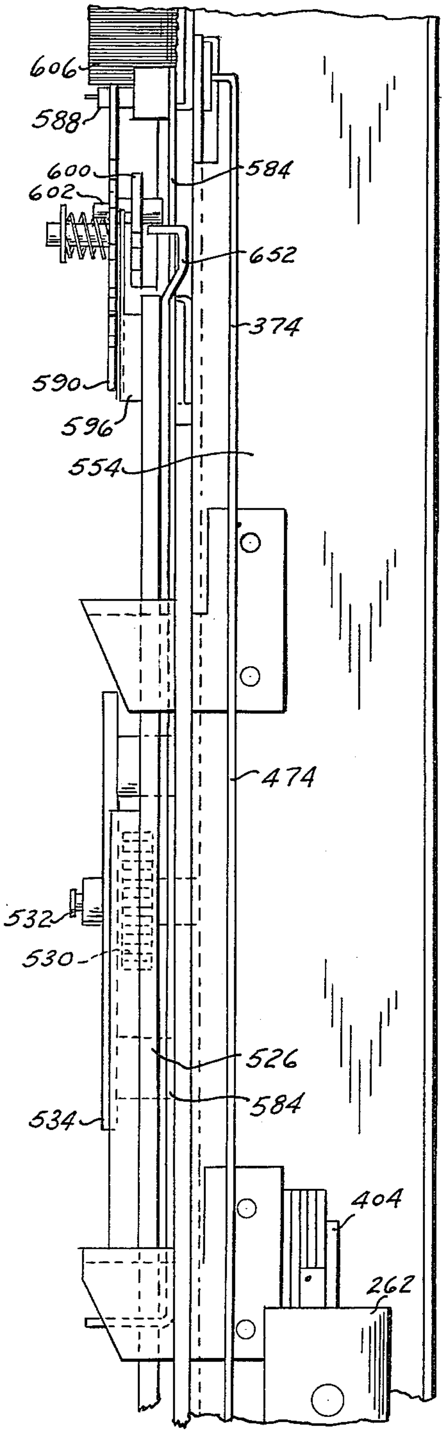
FIGURE 17 is a fragmentary elevation of the electrical form of our coin-released locking mechanism taken along the line 17—17 of FIGURE 14 and drawn on an enlarged scale.

The electrical version of our machine includes an unlatching solenoid 544 adapted to be energized to pull its armature 546 upwardly as viewed in FIGURE 14. A pin 548 pivotally connects armature 546 to one end of a latch 550 pivotally supported on a shaft 552 carried by a panel 554 of the machine. Latch 550 normally holds an arm 556 pivotally supported on a shaft 558 out of operative position against the action of a spring 560 connected between arm 556 and panel 554. When solenoid 544 is energized in a manner known to the art to actuate latch 550, it releases the arm 556 to permit the arm to move under the influence of spring 560 to operate a finger 562 to close a motor start switch 564.

The electrical version of our machine is provided with a motor 566 which drives a shaft 568 carrying a crank plate 570 for rotation with the shaft. A crank pin 572 carries a link 573 which is connected by a pin 574 to arm 283. A lateral extension 576 is adapted to engage the end of arm 556 remote from latch 550 to reset the latch after each operation of the machine. We form the periphery of a crank plate 570 with a cam surface 578 which acts on a finger 580 to control the operation of a switch 582 in a manner to be described to ensure that the motor moves through a complete revolution on each operation of the machine.

The price differential mechanism of the electrical version of our machine includes a price differential bar 584 similar to the price differential link 202 of the mechanical version of the machine. A spring 586 normally urges the bar downwardly as viewed in FIGURE 14 to hold a pin 588 against the surface of a price differential disk 590 rotatably supported on the machine by a shaft 592. A spring 594 normally urges the price differential disk 590 to a position at which the pin 588 rests on the cam surface corresponding to the base price for which the machine is set. The bracket 596 which supports shaft 592 carries a pin 598 which pivotally supports the price differential disk actuating lever 600. A pin 602 on disk actuating lever 600 rests in a slot 604 in price differential disk 590 to permit the disk actuating lever 600 to drive the price differential disk 590. One of a number of price differential solenoids 606, 608, and 610 is adapted to be energized to rotate disk actuating lever 600 in a clockwise direction as viewed in FIGURE 14 to rotate the price differential disk 590 through a predetermined distance to permit pin 588 to move to one of the levels of price differential disk 590 to permit price differential bar 584 to move downwardly through a distance equal to the price differential provided for the selected column or container.

The coin return link 472 of the electrical version of our machine carries a bracket 612 adapted to operate a switch 614 in response to actuation of the link to prevent energization of the circuit of motor 566 in a manner to be described hereinafter. The structure and operation of the remaining parts of the electrical version of our mechanism is similar to that described in connection with the mechanical version of the machine shown in FIGURES 1 to 13.

Figure 18:
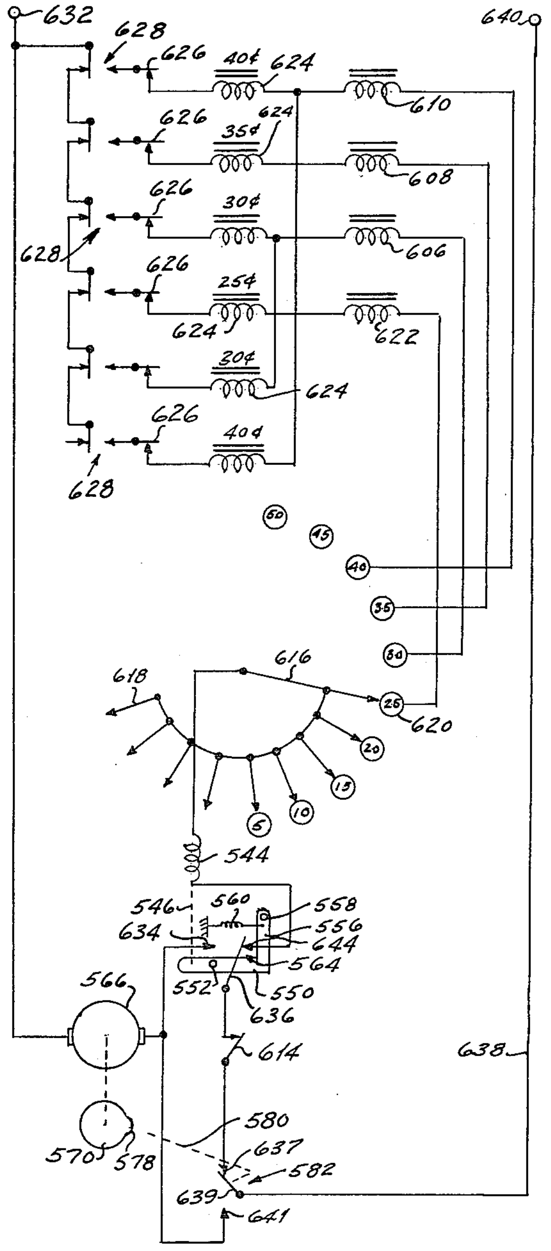
FIGURE 18 is a schematic view of one form of electrical circuit which may be used with the electrical version of our coin-released locking mechanism.

Referring now to FIGURE 18 which illustrates one form of electrical circuit which may be employed to control the electrical version of our machine, we have indicated the contact member 536 schematically as a switch arm 616 having a plurality of fingers 618 adapted to engage respective contacts 620 as pinion 530 steps around. We connect a dummy solenoid indicated by the reference character 622 in FIGURE 18 for the purposes of symmetry to the contact 620 corresponding to the base price for which the machine is set. In the particular arrangement shown, we have indicated that the solenoid is connected to the 25¢ contact thus providing a base price of 25¢. We connect the respective solenoids 606, 608, and 610 to contacts which are progressively 5¢ higher than the base price for which the machine is set. These respective price differential solenoids upon their energization move the disk 590 through respective distances to provide three price differentials over the base price. It will be apparent that the solenoid 610 affords the greatest differential since it is spaced further away from the pivot 598 than are the other two solenoids. Our machine includes a number of delivery solenoid windings 624 corresponding in number to the number of sections of the machine. We connect the solenoid windings 624 to the price lines including the price differential solenoid windings corresponding to the prices at which the articles of merchandise in the sections are to be sold. For example, with a six-section machine the solenoid windings 624 from top to bottom as viewed in FIGURE 18 may be connected to sell articles respectively at 40¢, 35¢, 30¢, the base price 25¢, 30¢, and 40¢. We connect an empty switch 626 and a selecting switch indicated generally by the reference character 628 in series with each of the selector solenoid windings 624. We connect the switches 628 to a conductor 630 connected to a terminal 632 of a suitable source of electrical potential in such manner that only one switch at a time can be actuated to energize its associated solenoid. We connect the motor 566 between the conductor 630 and one contact 634 of the motor start switch 564, indicated generally in FIGURE 18. We connect the contact arm 636 of switch 564 through the normally closed coin return switch 614 to one contact 637 of the motor follow-through switch 582, indicated generally in FIGURE 18. The contact arm 639 of switch 582 is connected to a conductor 638 leading to the other terminal 640 of the source. Arm 639 normally engages contact 637 and is adapted to be moved into engagement with the other contact 641 of switch 582 when the projection 578 on cam 570 leaves the arm 580, indicated schematically as a linkage 580 in FIGURE 18. We connect the unlatching solenoid winding 544 between the arm 616 and the other contact 644 of the motor start switch 564.

The coin return link 440 in the electrical version of our machine carries a stop 650 which prevents operation of the motor start arm 556 in the event that the customer pulls the coin return. We provide the bar 526 with a bracket 652 which raises the price differential bar 584 during the resetting operation of the machine to permit spring 594 to reset the price differential disk 590. Since the actuating mechanism for link 440 in the electrical version of our machine is similar to that in the mechanical version we have not shown it in FIGURE 14 for purposes of simplicity.

As has been explained hereinabove, the remaining parts of the electrical version of our machine are the same as the parts of the mechanical version of the machine shown in FIGURES 1 to 13. The lower end of price differential bar 584, as viewed in FIGURE 14, carries the pinion 310, which is engaged by the teeth 308 on the lower end of bar 526 and by the teeth 316 of the change determining bar 314. The motor-driven link 573 carried by the crank pin 572 and connected to arm 283 by pin 574 drives the arm 283, which carries the roller 291 for operating the change-making mechanism.

In our machine the stop bar 82, the price differential link 202 and the change determining bar 314 all move in a linear manner. The relative movement between the stop bar 82, which establishes a credit in the mechanism, and the change determining bar maintains this linearity. Owing to this fact the manner of operation of the change mechanism is independent of the base price for which the machine is set. The operation of the change mechanism also is independent of the price differential. Thus the base price and the price differential can be changed without changing the manner of operation of the change mechanism. That is, the change mechanism always gives change in the same manner with reference to the base price no matter for what base price the mechanism is set and whether or not a price differential is provided. From the foregoing it will be appreciated that our mechanism is extremely flexible.

In operation of the mechanical form of our coin-released locking mechanism, coins deposited in the machine through the coin slot 12 pass through the coin separator and slug ejector 14 and into the coin totalizer mechanism 16. Quarters passing through the totalizer mechanism 16 operate a feeler 46 to actuate the escapement latch 54 to permit rack 56 to move downwardly, as viewed in FIGURE 12, to cause the pinion 66 to move downwardly through a corresponding distance. Dimes passing through the totalizer operate both feelers 24 and 38 to actuate the latch 50 twice to permit a movement of link 70 corresponding to the deposit of a dime. Nickels actuate feeler 24 to operate escapement latch 50 once to permit link 70 to move downwardly through half the distance through which it moved in response to the deposit of a dime. Thus link 70 has an over-all movement which is the analogue of the sum in coins deposited in the machine.

The motion of link 70 is translated to the roller 80 through the medium of pin 74, register bar 76, and pin 78. Movement of roller 80 permits the stop bar 82 to move. When this operation has been accomplished, the customer may select an article of merchandise selling for a price equal to or less than the sum deposited. Coins passing through the totalizer come to rest on a coin shelf 386. Quarters and dimes rest on the horizontal portion 384 of the coin shelf 386 and nickels rest on the chute 392. They are retained in this position by a stop 412. If the customer for any reason wishes to have his money returned before he makes his purchase, he operates the knob 458 to actuate the bell crank including arm 466 to move the coin return link 440 downwardly, as viewed in FIGURES 4 and 5. In response to this movement, member 442 moves downwardly to permit the coin shelf 386 to tilt in a direction to return the deposited coins to the customer. At the same time roller 514 moves against coin surface 498 to raise reset arm 500 to reset the totalizer mechanism in a manner described previously.

If, after having deposited a sum in coins equal to the purchase price of an article, the customer wishes to make a selection, he pulls the knob 98 corresponding to the desired article. As has been pointed out hereinabove, our machine is adapted to dispense articles selling at a base price and at certain price differences over the base price. As the stop bar 82 moves downwardly, its teeth 308 drive pinion 310 to move the change determining bar 314 upwardly as viewed in FIGURE 4. When a sum in excess of the base price is deposited, the change determining bar 314 moves upwardly through a sufficient distance to cause rod 326, which has been set in a hole 328 corresponding to the base price, to set the stop plate 340 to permit giving of a sum in change equal to the difference between the base price of an article and the sum deposited. Thus, as soon as he deposits money, the customer is credited with the amount deposited and the machine is set to give a sum in change equal to the excess of the amount deposited over the base price.

If the customer selects an article selling at the base price, he pulls a knob 98 to move locking bar 154 to the left as viewed in FIGURE 3 and to the right as viewed in FIGURE 4. As soon as a sum at least equal to the base price has been deposited, stop block 88 is out of the path of stop pawl 172 and the purchase may be made. At the same time locking bar 154 drives the arm 283 carrying the roller 291, which drives the lever 282, in a counterclockwise direction, as viewed in FIGURE 5. Under the action of this lever, a pin 252 engages the coin member 454 on the coin shelf 386 to tilt the coin shelf in a direction to accept the money. At the same time the pin 236 on lever 282 drives the reset bar 278 to dispense a number of nickels in change equal to the difference between the base price and the sum deposited.

Should the customer pull a knob 98 corresponding to an article selling for a price greater than the base price, the finger 100 actuates a price differential crank arm 210 or 212 to drive price differential disk 184 through a predetermined angular movement to move the price differential link 202 downwardly as viewed in FIGURE 4. It will be remembered that upon the deposit in the machine of a sum in coins exceeding the base price, change determining bar 314 moved upwardly through a distance equal to the analogue of the excess deposited. When the price differential mechanism operates, a pinion 310 moves downwardly to cancel at least a portion of the credit set up on change determining bar 314. As a result of this action, the final position of the change determining bar 314 corresponds to the difference between the amount deposited and the purchase price of the particular article selected. It will be remembered too that the price differential link 202 positions the plate 160 so that locking bar 154 is not free to move until at least a sum corresponding to the purchase price of the selected article has been deposited.

From this description it will be clear that when an article selling at a purchase price which is greater than the base price is selected, the price differential mechanism positions plate 160 to prevent locking bar 154 from being freed until at least the purchase price is deposited. Further, the price differential link 202 cancels at least a portion of the credit set up on change determining bar 314 to cause the correct sum in change to be given to the customer no matter what article is selected. In response to the dispensing operation, roller 496 acts on reset arm 500 to reset the totalizer mechanism.

As has been explained hereinabove, nickels deposited in the machine come to rest on the chute 392. When the money is to be accepted, rather than falling into the coin box, one nickel is directed into the coin tube 262 by the action of a pin 422, which moves the stop 412 out of the path of the nickels. In the event the coin tube is full, coins in the tube position lever 426 to cause a stop 434 to prevent deposited nickels from rolling onto chute 392. When this occurs, the nickels are accepted in the usual manner and fall into the coin box along with dimes and quarters. If the supply of coins in the coin tube 262 is exhausted, bar 370 is actuated to deflect dimes and quarters deposited in the machine to the return chute so that the machine can be operated in response to the deposit of nickels.

In operation of the electrical version of our machine, shown in FIGURES 14 to 18, coins deposited in the machine position the roller 80 in a manner described hereinabove in connection with the mechanical version of the machine. Thus the member 536 sets up circuits which permit articles selling at a price equal to the sum deposited and all lower prices to be selected. When a selecting button corresponding to an article is actuated, the corresponding delivery solenoid 624 is energized to dispense an article in a manner known to the art. At the same time the circuit to motor 566 is completed to permit the motor to move through one revolution to drive arm 283 through the medium of link 573 to dispense change, if change is to be given, and to reset the coin mechanism. Upon the actuation of a button and before the change mechanism is operated, if a price differential is provided, one of the price differential solenoids 606, 608, and 610 is energized to rotate the price differential disk 590 to cancel at least a portion of the credit set up in the change mechanism to give the correct change in substantially the same manner as was done in the mechanical version of the machine.

We have shown a particular form of our machine in which the price differential mechanism subtracts from the credit established to move the assembly toward a base price which is the lowest price at which an article is sold. That is, the price differential link or bar 292 moves upwardly as viewed in FIGURE 4 upon operation of the price differential mechanism to subtract from the credit established by the position of the slide 82 and to subtract from change credit established by the position of the change rack 314. Other arrangements within the scope of our invention are contemplated. For example, we may, if desired, set our mechanism to operate with reference to a base price which is the highest price at which an article is sold. In this arrangement the machine is modified, as will be understood by those skilled in the art, so that the price differential mechanism simulates the deposit of coins and so that the mechanism is released, so that credit is established and so that correct change is given in the manner described hereinabove. Another arrangement contemplated is one in which the change mechanism is initially set up to give the maximum change and, under the action of the price differential mechanism nickel change credits are subtracted from the maximum number as the sale price of an article differs from the base price. The amount of subtraction is limited by the position of the totalizer bar as determined by the sum deposited.

It will be seen that we have accomplished the objects of our invention. We have provided a coin mechanism which is extremely flexible both as to the combination of coins which it may receive and as to the range of prices for which it may be set. Our mechanism may control a number of machine sections selling articles of merchandise at different respective prices. Our machine not only provides a price differential but also gives the correct change to a customer in the event that a sum in excess of the sale price of a selected article is deposited in the machine. The supply of change in our machine is automatically replenished from coins deposited in the machine. Our coin mechanism may be applied either to a mechanically operated or to an electrically operated machine.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a merchandising machine adapted to dispense for a certain price differing from a base price, normally locked dispensing means, an element for unlocking said dispensing means, means for actuating said dispensing means, means responsive to the deposit of a sum in coins in excess of said certain price and differing from said base price for moving said unlocking element to unlocking position, a change mechanism including a member adapted to be positioned to determine various sums to be given in change, means coupling said coin-responsive means to said change determining member to move said determining member to a position at which said change mechanism when operated would give an amount in change equal to the difference between the sum deposited and said base price, means responsive to the operation of said dispensing means for moving said change determining member to subtract the difference between said certain price and said base price from the setting of said change determining member under the action of said coin-responsive means and means responsive to the operation of said dispensing means for operating said change mechanism.

2. In a merchandising machine adapted to dispense for a certain price differing from a base price, normally locked dispensing means, an element for unlocking said dispensing means, means for actuating said dispensing means, means responsive to the deposit of coins for moving said unlocking element rectilinearly as a linear function of the sum deposited to unlocking position, a change mechanism including a member adapted to be positioned to determine various sums to be given in change, means coupling said coin-responsive means to said change determining member to move said change determining member rectilinearly as a linear function of the sum deposited to a position corresponding to an amount in change equal to the difference between the sum deposited and said base price, price differential means responsive to the operation of said dispensing means for moving said change determining member rectilinearly as a linear function of the difference between said certain price and said base price and change ejecting means responsive to the operation of said dispensing means.

3. In a merchandising machine adapted to dispense for a certain price differing from a base price, normally locked dispensing means, an element for unlocking said dispensing means, means for actuating said dispensing means, means responsive to the deposit of coins for producing a linear displacement of said unlocking means proportional to the sum deposited to move said unlocking element to unlocking position, a change mechanism including a member adapted to be positioned to determine various sums to be given in change, means coupling said coin-responsive means to said change determining member to cause a linear displacement of said determining member to a position corresponding to an amount in change equal to the difference between the sum deposited and said base price, price differential means responsive to the operation of said dispensing means for producing a linear displacement of said change determining member proportional to the difference between said certain price and said base price and change ejecting means responsive to the operation of said dispensing means.

4. In a merchandising machine adapted to dispense at various purchase prices related to a base price by predetermined price differentials, a plurality of dispensing means, respective selecting means for controlling said dispensing means, means normally locking said dispensing means against operation, said locking means comprising a locking bar, means mounting said bar for displaceable movement, a floating means for supporting said bar in a predetermined position and an unlocking element adapted to be positioned to permit said dispensing means to be operated, means responsive to the deposit of coins aggregating the purchase price of a selected article in said mechanism for positioning said unlocking element to permit the corresponding dispensing means to be operated, a change mechanism including a member adapted to be positioned to determine various sums to be given in change, means coupling said coin-responsive means to said change determining member to set the change mechanism to give an amount in change equal to the difference between the sum deposited and said base price, a price differential means, means responsive to the operation of said selecting means for moving said price differential means, means responsive to movement of said price differential means for moving said floating supporting means and means responsive to movement of said price differential means for moving said change determining member through a distance proportional to the difference between the purchase price of a selected article and said base price and coin ejecting means responsive to the operation of said dispensing means.

5. In a merchandising machine adapted to dispense at various purchase prices related to a base price by predetermined price differentials, a plurality of dispensing means, respective selecting means for controlling said dispensing means, means normally locking said dispensing means against operation, said locking means including an unlocking element adapted to be positioned to permit said dispensing means to be operated, means including a totalizer bar formed with rack teeth responsive to the deposit of coins aggregating the purchase price of a selected article in said machine for positioning said element to permit the corresponding dispensing means to be operated, a change mechanism including a change determining rack adapted to be positioned to determine various sums to be given in change, means coupling said coin-responsive means to said change determining rack to set the change mechanism to give an amount in change equal to the difference between the sum deposited and said base price, a price differential bar, a pinion carried by said bar for providing a driving connection between said price differential bar and said totalizer bar, means responsive to the operation of said selecting means for moving said price differential bar to move said change determining rack and coin ejecting means responsive to the operation of said dispensing means.

6. In a merchandising machine a coin separator for separating coins deposited therein according to denomination, a coin support adapted to receive deposited coins from said separator, a change coin tube, said coin support being formed with a portion adapted to direct deposited coins of a certain denomination to said tube, means normally restraining coins of said certain denomination from passing to said tube, an article dispensing means and means responsive to operation of said dispensing means for releasing a deposited coin of said certain denomination to permit said released coin to pass into said change tube.

7. In a merchandising machine a coin separator for separating coins deposited therein according to denomination, a coin support adapted to receive deposited coins from said separator, a change coin tube, said coin support being formed with a portion adapted to direct deposited coins of a certain denomination to said tube, means normally restraining deposited coins of said certain denomination from passing to said tube, an article dispensing means, means responsive to operation of said dispensing means for releasing a deposited coin of said certain denomination to permit said released coin to pass into said change tube and means responsive to the presence of a full supply of coins in said tube for preventing additional coins from passing from said support into said tube.

8. In a merchandising machine a coin separator for separating coins deposited therein according to denomination, a coin support, said support normally occupying an escrow position at which it receives and supports deposited coins from said separator, means pivotally mounting said coin support for movement to a first position at which deposited coins on said support pass to one side thereof and to a second position at which coins pass to the other side thereof, a change coin tube, said coin support being formed with a portion adapted to direct deposited coins of a certain denomination to said tube, means normally restraining deposited coins of said certain denomination from passing to said tube, dispensing means, means responsive to operation of said dispensing means for releasing a deposited coin of said certain denomination to permit said released coin to pass into said change tube and to pivot said support to said first position whereby all coins remaining on said support are accepted, a coin return mechanism and means responsive to operation of said coin return mechanism for moving said support to said second position whereby all coins on said support are returned to the depositor.

9. In a merchandising machine adapted to dispense at various purchase prices related to a base price by predetermined price differentials, a plurality of dispensing means, respective selecting means for controlling said dispensing means, means normally locking said dispensing means against operation, said locking means including an unlocking element adapted to be positioned to permit said dispensing means to be operated, means responsive to the deposit of coins aggregating one of said various purchase prices in said machine for positioning said element to permit the corresponding dispensing means to be operated, a change mechanism including a member adapted to be positioned to determine various sums to be given in change, means coupling said coin-responsive means to said change determining member to set the change mechanism to give an amount in change equal to the difference between the sum deposited and said base price, a price differential bar, means including a price differential disc for normally positioning said price differential bar at a position corresponding to the base price, means for coupling said price differential bar to said change determining member, means including a crank adapted to be actuated to move said price differential disc to move said price differential bar through a distance proportional to the difference between the purchase price and said base price, means responsive to the operation of said selecting means for actuating said crank and coin ejecting means responsive to the operation of said dispensing means.

10. In a merchandising machine adapted to dispense at various purchase prices related to a base price by predetermined price differentials, a plurality of dispensing means, respective selecting means for controlling said dispensing means, means normally locking said dispensing means against operation, said locking means including an unlocking element adapted to be positioned to permit said dispensing means to be operated, means responsive to the deposit of coins aggregating one of said various purchase prices for positioning said element to permit the corresponding dispensing means to be operated, a change mechanism including a member adapted to be positioned to determine various sums to be given in change, means coupling said coin-responsive means to said change determining member to set the change mechanism to give an amount in change equal to the difference between the sum deposited and said base price, a price differential bar, means for normally positioning said bar at a position corresponding to said base price, means coupling said price differential bar to said price determining member, means including an electromagnetic means adapted to be energized to move said price differential bar through a distance proportional to the difference between the purchase price and said base price, means responsive to the actuation of a selecting means for energizing said solenoid and coin ejecting means responsive to the operation of said dispensing means.

11. In a merchandising machine adapted to dispense at various purchase prices related to a base price by predetermined price differentials, a plurality of dispensing means, respective selecting means for controlling said dispensing means, means normally locking said dispensing means against operation, said locking means including an unlocking element adapted to be positioned to permit said dispensing means to be operated, means responsive to the deposit of coins aggregating one of said various purchase prices for positioning said element to permit the corresponding dispensing means to be operated, a change mechanism including a member adapted to be positioned to determine various sums to be given in change, means coupling said coin-responsive means to said change determining member to set the change mechanism to give an amount in change equal to the difference between the sum deposited and said base price, means including a plurality of price differential solenoids adapted to be energized to move said change determining member through a distance proportional to the difference between various respective purchase prices and said base price, means responsive to the actuation of respective selecting means for energizing one of said solenoids and coin ejecting means responsive to the operation of said dispensing means.

12. In a merchandising machine adapted to dispense for a certain price, dispensing means including a member movable upon each operation of said dispensing mechanism, a locking pawl loosely carried by said member, a spring normally positioning said pawl on said member, a locking element, means mounting said locking element for movement from a position in the path of said pawl to prevent operation of said dispensing means to a position out of the path of said pawl to permit operation of said dispensing means and means responsive to the deposit of a sum of coins in said machine equal to said purchase price for moving said element out of the path of said pawl to free said dispensing means.

13. In a merchandising machine adapted to dispense for a certain price differing from a base price, dispensing means, means normally locking said dispensing means, means for actuating said dispensing means, price differential means responsive to said dispensing means actuating means, a change mechanism including a member adapted to be positioned to give various sums in change, means responsive to the deposit of coins and to the operation of said price differential means for unlocking said locking means and means responsive to the deposit of coins and to the operation of said price differential means for actuating said change mechanism to give a sum in change equal to the difference between the sum deposited and said certain price.

14. In a merchandising machine adapted to dispense for a certain price differing from a base price, normally locked dispensing means, means for actuating said dispensing means when unlocked, a first movable member normally positioned at a location corresponding to said base price, means responsive to the deposit of coins for moving said first movable member through a displacement relative to said base price proportional to the sum of coins deposited in said machine, a second movable member normally positioned at a location corresponding to said base price, means responsive to the operation of said dispensing means for moving said second movable member through a displacement relative to said base price proportional to the difference between said base price and said certain price, first means for comparing the motion of said first movable member with that of said second movable member for unlocking said dispensing means when the sum deposited is at least equal to said certain price and second means for comparing the movement of said first and second movable members for giving change in an amount equal to the difference between the sum deposited and said certain price.

15. In a merchandising machine adapted to dispense for a certain price, normally locked dispensing means, an element for unlocking said dispensing means, means responsive to the deposit of coins for moving said unlocking element to unlocking position, a change mechanism comprising a plurality of respective elements each adapted to be operated to return a coin in change, a change determining member adapted to be positioned in accordance with the sum in change to be given, means coupling said coin responsive means to said change determining member to position said member, means responsive to the operation of said dispensing means for engaging a number of said elements in accordance with the position of said determining member and for moving said elements simultaneously to dispense a number of coins totalling the change to be given.

References Cited in the file of this patent

UNITED STATES PATENTS

| | | |
|---|---|---|
| 1,948,107 | Gilchrist et al. | Feb. 20, 1934 |
| 2,133,525 | Barnard | Oct. 18, 1938 |
| 2,156,531 | Geer | May 2, 1939 |
| 2,377,413 | Fry | June 5, 1945 |
| 2,446,182 | Lannom | Aug. 3, 1948 |
| 2,649,947 | Nelson | Aug. 25, 1953 |
| 2,724,391 | Fremon | Nov. 22, 1955 |
| 2,802,473 | Keefe | Aug. 13, 1957 |

FOREIGN PATENTS

| | | |
|---|---|---|
| 503,257 | Great Britain | Apr. 4, 1939 |
| 787,501 | Great Britain | Dec. 11, 1957 |